United States Patent
Levanon

Patent Number: 5,920,522
Date of Patent: Jul. 6, 1999

[54] ACOUSTIC HIT INDICATOR

[76] Inventor: Nadav Levanon, 10 Avigdor Hameirl St., Ramat Gan, Israel, 52651

[21] Appl. No.: 08/889,149

[22] Filed: Jul. 7, 1997

[30] Foreign Application Priority Data

Jul. 14, 1996 [IL] Israel ........................................ 118846

[51] Int. Cl.⁶ ....................................................... G01S 5/18
[52] U.S. Cl. ............................................ 367/129; 367/906
[58] Field of Search ..................................... 367/127, 129, 367/906

[56] References Cited

U.S. PATENT DOCUMENTS

| | | |
|---|---|---|
| 3,445,808 | 5/1969 | Johnson . |
| 4,261,579 | 4/1981 | Bowyer et al. ........................... 367/906 |
| 4,323,993 | 4/1982 | Soderblom et al. . |
| 4,351,026 | 9/1982 | Phillips . |
| 4,514,621 | 4/1985 | Knight et al. . |
| 4,659,034 | 4/1987 | Diekmann . |
| 4,805,159 | 2/1989 | Negendank et al. . |
| 4,885,725 | 12/1989 | McCarthy et al. . |
| 5,168,475 | 12/1992 | McNelis et al. . |
| 5,241,518 | 8/1993 | McNelis et al. . |
| 5,247,488 | 9/1993 | Borberg et al. . |

FOREIGN PATENT DOCUMENTS

| | | |
|---|---|---|
| 157397 | 3/1985 | European Pat. Off. . |
| 248018 | 10/1986 | European Pat. Off. . |
| 259428 | 9/1987 | European Pat. Off. . |
| 684485 | 11/1995 | European Pat. Off. . |
| 2083177 | 3/1982 | United Kingdom . |
| WO 79/00452 | 7/1979 | WIPO . |
| WO 87/05706 | 9/1987 | WIPO . |
| WO 91/10876 | 7/1991 | WIPO . |

*Primary Examiner*—Ian J. Lobo
*Attorney, Agent, or Firm*—Nixon & Vanderhye P.C.

[57] ABSTRACT

This invention discloses a method of indicating information related to the trajectory of a projectile traveling at a supersonic velocity, the trajectory intersecting a predefined target plane at a point of incidence and having an angle of incidence with the target plane, the method including sensing a shock wave generated by the projectile at a plurality of fixed locations in a vicinity of the target plane, not all of which locations lie on a single straight line, and providing a plurality of outputs responsive, respectively, to the shock wave sensed at the plurality of locations determining a time-delay for each of the plurality of locations, relative to a predefined, common, reference time, based on the plurality of outputs and determining at least one of the point of incidence, the angle of incidence and the supersonic velocity by at least estimating a solution to a set of time-delay equations, each equation providing an independent representation of only one of the time-delays as a function of the point of incidence, the angle of incidence and the supersonic velocity.

A system for indicating information related to the trajectory of a projectile traveling at a supersonic velocity and intersecting a predefined target plane at a point of incidence, the trajectory having an angle of incidence with the target plane is also disclosed.

27 Claims, 13 Drawing Sheets

ACOUSTIC HIT INDICATOR

FIELD OF THE INVENTION

The present invention relates to trajectory monitoring in general and, more particularly, to an improved acoustic hit indicator.

BACKGROUND OF THE INVENTION

Methods of detecting and/or monitoring and/or evaluating the trajectory of a supersonic projectile based on detection of shock-wave produced by the projectile are known in the art. FIG. 1A schematically illustrates a projectile 10, e.g. a bullet or a shell, traveling at a supersonic speed along a trajectory 20. Projectile 10 typically generates a pressure shock-wave, commonly referred to as a sonic boom, which propagates within a conical field 12. As shown in FIG. 1A, conical field 12 is defined by a tip 14 at projectile 10 and an angle, $\beta$, which is determined by the following equation:

$$\beta = \sin^{-1}(c/v), \quad C < v \quad (1)$$

wherein C is the speed of sound and v is the speed of the projectile.

In the example shown in FIG. 1A, the shock wave generated by projectile 10 is sensed by a sensor 16, for example an acoustic transducer. Since the shock-wave is confined to field 12, the shock wave is not sensed by a sensor 18 which is situated outside the boundaries of field 12. However, after a short time period, as tip 14 of field-of-view 12 advances along trajectory 20, the shock wave is sensed also by sensor 18.

FIG. 1B schematically illustrates the outputs 22 of four acoustic transducers in a vicinity of a supersonic projectile as a function of time. The transducers are positioned at different locations and, therefore, the shock wave generated by the projectile is sensed by the different transducers at different times. The magnitudes of the sensed shock waves are also position-dependent and are, therefore, different for the different transducers. As shown in FIG. 1B, each transducer output 22 is characterized by an abrupt, transient peak, as the shock wave reaches the transducer, followed by a gradual decay. The abrupt acoustic transient causing the transient peak is generally referred to as a sonic boom. The short rise time of the transient peak, typically on the order of 1 microsecond, enables very accurate determination of the time of arrival of the sonic boom at the transducer. However, determining the trajectory of the projectile based on the transducer outputs is extremely complex and, therefore, relies on physical assumptions which considerably reduce the reliability and accuracy of the system.

One common application of determining the trajectories of projectiles is in hit indication systems. In such systems, a plurality of sensors, e.g. acoustic transducers, are positioned at different locations in a vicinity of a target plane, which may be a virtual target plane. The point at which a projectile intersects the target plane is determined based on the relative times of arrival of the sonic booms at the different sensors and based on certain assumptions which introduce hit indication errors, as described below.

In some known hit indicator systems, it is assumed that the trajectory of the projectile is perpendicular to the target plane at the point of incidence. This assumption simplifies the calculations involved in determining the point of incidence at the target plane. However, when the trajectory of the projectile is substantially not perpendicular to the target plane, the accuracy of such systems is dramatically reduced. Hit indication systems based on the assumption of the trajectory being perpendicular to the target plane are described, inter alia, in U.S. Pat. Nos. 4,514,621 and 4,885,725. It should be noted that the mathematical models suggested by these references do not apply to situations in which the direction of the trajectory is not perpendicular to the target plane. Furthermore, the mathematical equations derived for these models cannot be modified to account for trajectories which are not perpendicular to the target plane.

In other known hit indicator systems, the calculations involved in determining the trajectory of the projectile at the target plane are based on the use of unique geometrical configurations of sensors. For example, in the above-mentioned '725 patent and in U.S. Pat. No. 5,241,518, the sensors are arranged in a plurality of triangular sub-array configurations, each sub-array including three sensors. A three-dimensional direction vector, normal to the shock-wave front, is calculated for each triangular sub-array, based on the relative times of arrival of the sonic booms at the three sensors of the sub-array. It is appreciated that if the direction of the trajectory is unknown, a minimum of three such triangular sub-arrays is required in order to determine the point of incidence of the trajectory at the target plane. Therefore, this approach requires the use of at least 9 sensors and imposes a geometrical constraint on the positioning of the sensors. Furthermore, not all the information obtainable from the sensors is utilized, for example, in the above-mentioned '518 patent, the relative time-delays between the different sub-arrays are not used.

SUMMARY OF THE INVENTION

It is an object of the present invention to provide an improved, accurate, hit indication system for determining incidence points and/or incidence angles and/or velocities of supersonic projectiles having unknown trajectories, at a target plane, based on inputs from a plurality of acoustic sensors which are arranged in a non-specific, fixed, configuration in a vicinity of the target plane. To achieve that goal, the present invention provides a method for accurately indicating the incidence points and/or incidence angle and/or velocities of the projectiles based on the relative times of arrival, also referred to herein as "time delays", of sonic booms at the sensors. The sensors are preferably acoustic transducers as are know in the art.

In a preferred embodiment of the invention, the hit indication system includes an array of at least five acoustic sensors, not all lying on one straight line, which provide inputs to a processor incorporating circuitry and or software for determining the incidence points. The calculation method of the present invention enables accurate determination of the incidence points, based on the delay times at the different sensors, regardless of the directions of the trajectories of the projectiles relative to the target plane. Information corresponding to the incidence points, also referred to herein as "hits", and/or to the incidence angles and/or to the projectile velocities is preferably displayed, graphically and/or digitally, on a visual display. Additionally or alternatively, the information on the hits and/or the incidence angles and/or the projectile velocities is communicated to a central control unit which communicates with additional hit indication systems as described above.

According to one aspect of the present invention, the indication method includes constructing a set of non-linear equations corresponding to a given trajectory, each equation providing an isolated mathematical expression of only one of the time-delays as a function of parameters other than the other time-delays.

Additionally or alternatively, the indication method includes estimating a solution to the set of non-linear time-delay equations, to provide estimated coordinates of the incidence point. In some preferred embodiments of the present invention, the estimation method includes an iterative, least-squares, solution of the non-linear equations, for example a variation of a Gauss-Newton solution.

There is thus provided, in accordance with a preferred embodiment of the invention, a method of indicating information related to the trajectory of a projectile traveling at a supersonic velocity, the trajectory intersecting a predefined target plane at a point of incidence and having an angle of incidence with the target plane, the method including:

sensing a shock wave generated by the projectile at a plurality of fixed locations in a vicinity of the target plane, not all of which locations lie on a single straight line, and providing a plurality of outputs responsive, respectively, to the shock wave sensed at the plurality of locations;

determining a time-delay for each of the plurality of locations, relative to a predefined, common, reference time, based on the plurality of outputs, and determining at least one of the point of incidence, the angle of incidence and the supersonic velocity by at least estimating a solution to a set of time-delay equations, each equation providing an independent representation of only one of the time-delays as a function of the point of incidence, the angle of incidence and the supersonic velocity.

In a preferred embodiment of the present invention, the method further includes providing an output responsive to the estimated value of at least one of the point of incidence, the angle of incidence and the supersonic velocity. Preferably, the method includes displaying the estimated value of at least one of the point of incidence, the angle of incidence and the supersonic velocity.

In a preferred embodiment of the invention, the plurality of locations include at least five separate locations in the vicinity of the target plane. Preferably, at least two of the locations are not at the same distance from the target plane.

In a preferred embodiment of the present invention, estimating a solution to a set of time-delay equations includes estimating a solution to a set of equations of the form:

$$t_k = t_{\text{offset}} - \frac{1}{v}[(x_B - x_k)\sin\alpha + (y_B - y_k)\cos\alpha] +$$

$$\sqrt{[(x_B - x_k)\cos\alpha - (y_B - y_k)\sin\alpha]^2 + (h - h_k)^2}\sqrt{\frac{1}{C^2} - \frac{1}{v^2}},$$

$$k = 1, 2, \ldots, N$$

wherein $(x_k, y_k, h_k)$, $k=1, 2, \ldots, N$, represent the coordinates of N of the plurality of locations, respectively, $y_B$ represents a coordinate of a predefined reference plane parallel with the target plane, $\alpha$ represents the angle of incidence, $t_{\text{offset}}$ represents the reference time and $x_B$ and h represent coordinates of the trajectory on the parallel reference plane.

In some preferred embodiments of the invention, at least estimating a solution to the set of time-delay equations includes applying a least-squares estimation algorithm. Preferably, in these preferred embodiments, the least-squares estimation algorithm includes an iterative least-squares estimation algorithm. Additionally or alternatively, the least-squares estimation algorithm includes a variation of a Gauss-Newton solution.

In a preferred embodiment of the present invention, the angle of incidence lies on a predefined incidence plane substantially perpendicular to the target plane. Preferably, the predefined incidence plane includes a substantially horizontal plane and the target plane includes a substantially vertical plane.

Further, in accordance with a preferred embodiment of the present invention, there is provided a system for indicating information related to the trajectory of a projectile traveling at a supersonic velocity and intersecting a predefined target plane at a point of incidence, the trajectory having an angle of incidence with the target plane, the system including:

a plurality of acoustic sensors located at fixed positions in the vicinity of the target plane, not all of which positions lie on a single straight line, each sensor providing an output responsive to a shock wave generated by the projectile; and a processor which determines a time-delay for each of the plurality of positions, relative to a predefined, common, reference time, based on the outputs of the sensors, and which determines at least one of the point of incidence, the angle of incidence and the supersonic velocity by at least estimating a solution to a set of time-delay equations, each equation providing an independent representation of only one of the time-delays as a function of the point of incidence, the angle of incidence and the supersonic velocity.

In a preferred embodiment of the present invention, the system further includes a display for displaying the estimated value of at least one of the point of incidence, the angle of incidence and the supersonic velocity.

In a preferred embodiment of the present invention, the plurality of sensors include at least five sensors. Preferably, at least two of the sensors are not at the same distance from the target plane.

In a preferred embodiment of the present invention, the set of time-delay equations includes a set of equations of the form:

$$t_k = t_{\text{offset}} - \frac{1}{v}[(x_B - x_k)\sin\alpha + (y_B - y_k)\cos\alpha] +$$

$$\sqrt{[(x_B - x_k)\cos\alpha - (y_B - y_k)\sin\alpha]^2 + (h - h_k)^2}\sqrt{\frac{1}{C^2} - \frac{1}{v^2}},$$

$$k = 1, 2, \ldots, N$$

wherein $(x_k, y_k, h_k)$, $k=1, 2, \ldots, N$, represent the coordinates of the positions of N of the plurality of sensors, respectively, $y_B$ represents a coordinate of a predefined reference plane parallel with the target plane, $\alpha$ represents the angle of incidence, $t_{\text{offset}}$ represents the reference time and $x_B$ and h represent coordinates of the trajectory on the parallel reference plane.

In some referred embodiments of the present invention, the processor at least estimates a solution of the time-delay equations by applying a least-squares estimation algorithm. Preferably, in these preferred embodiments, the least-squares estimation algorithm includes an iterative least-squares estimation algorithm. Additionally or alternatively, the least-squares estimation algorithm includes a variation of a Gauss-Newton solution.

In a preferred embodiment of the present invention, the incidence angle lies on a predefined incidence plane substantially perpendicular to the target plane. Preferably, the predefined incidence plane includes a substantially horizontal plane and the target plane includes a substantially vertical plane.

In some preferred embodiments of the present invention, the system includes a control unit and the processor provides the control unit with an output responsive to the estimated value of at least one of the point of incidence, the angle of incidence and the supersonic velocity.

In a preferred embodiment of the present invention, the plurality of acoustic sensors includes a plurality of acoustic transducers.

BRIEF DESCRIPTION OF THE DRAWINGS

The present invention will be understood and appreciated more fully from the following detailed description of preferred embodiments of the invention, taken in conjunction with the following drawings in which.

DETAILED DESCRIPTION OF PREFERRED EMBODIMENTS

Figure 1A:
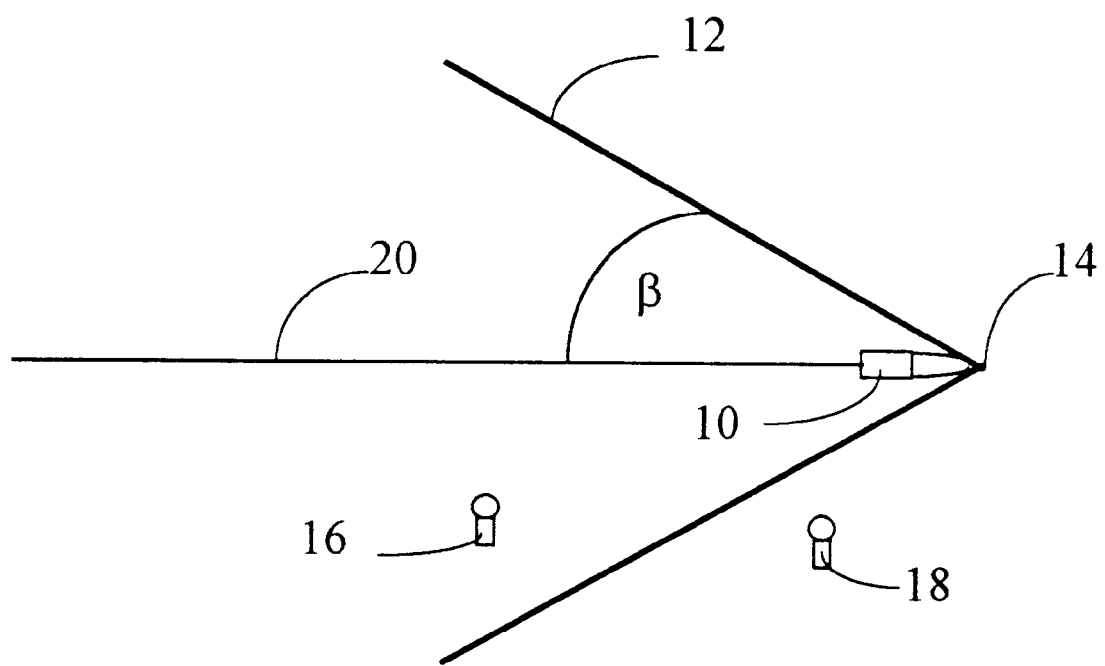
FIG. 1A is a schematic illustration of a supersonic projectile generating a shock wave, as is known in the art.
Figure 1B:
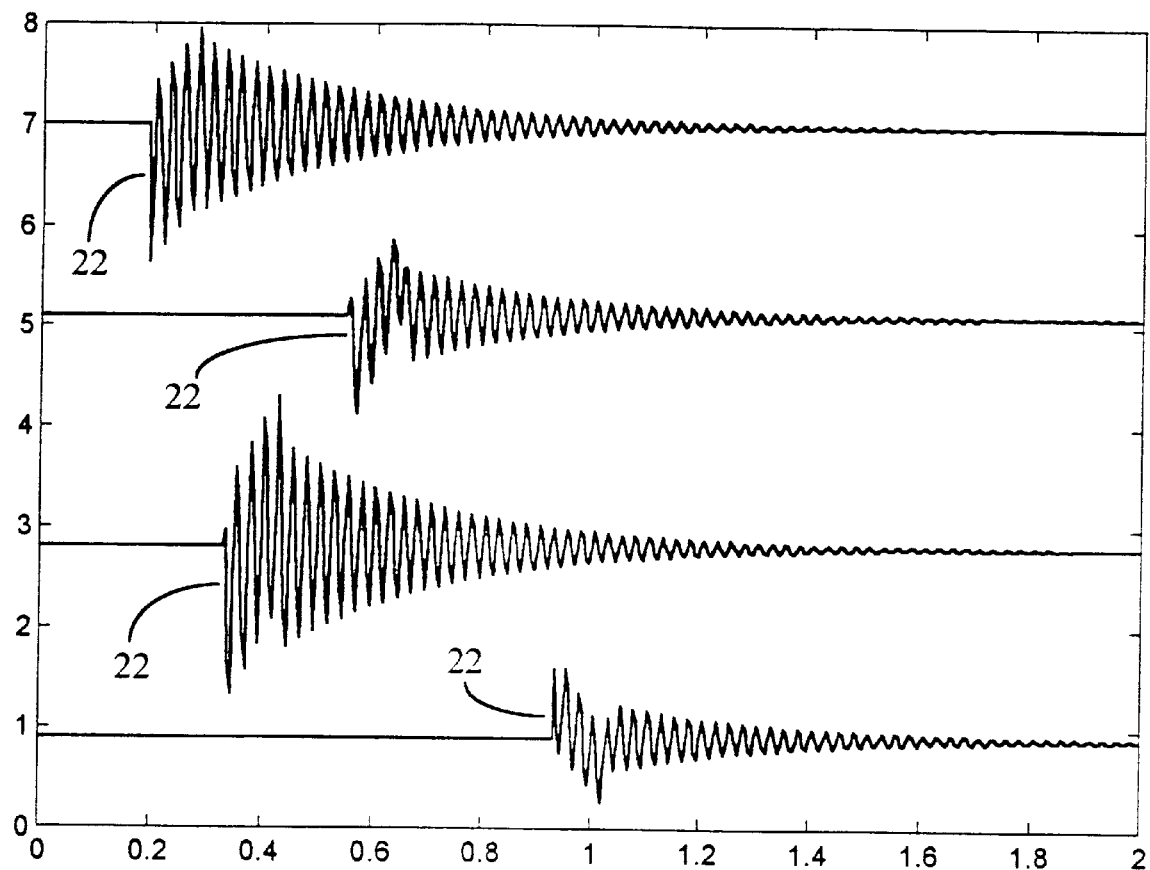
FIG. 1B is a schematic illustration of the outputs of four acoustic transducers as a function of time in response to a supersonic shock wave, as is known in the art.
Figure 2:
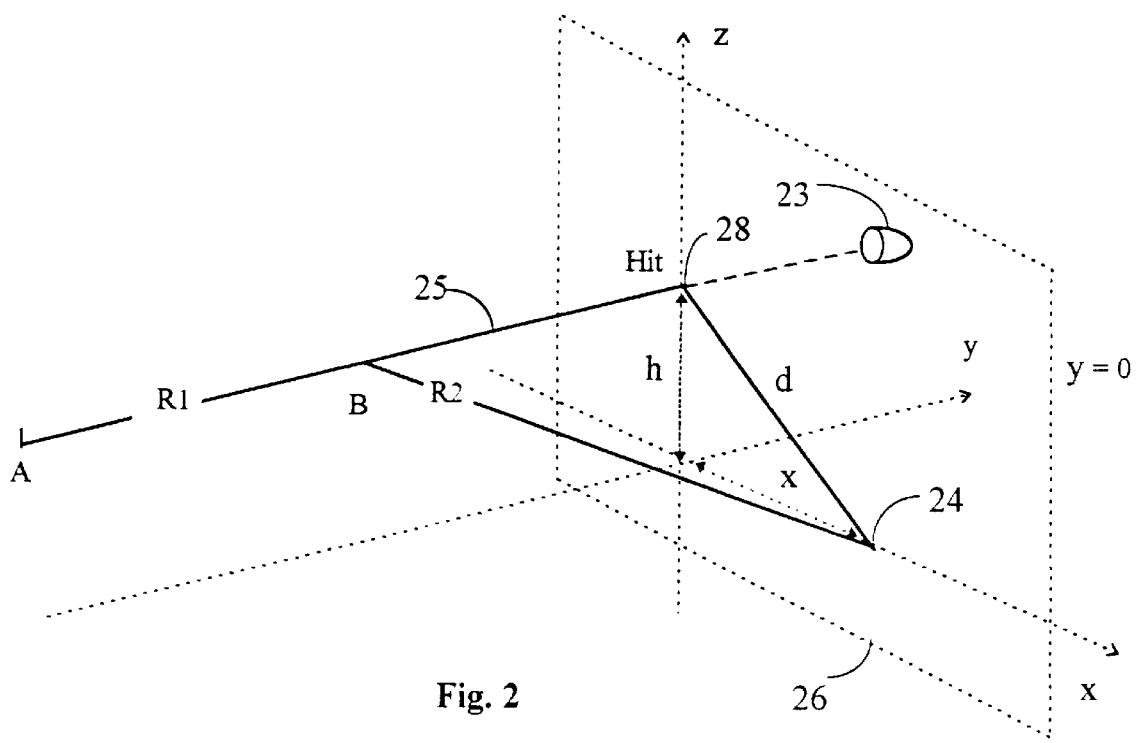
FIG. 2 is a schematic illustration of a projectile trajectory intersecting a virtual target plane, wherein the trajectory is perpendicular to the target plane.

Reference is now made to FIG. 2 which schematically illustrates a trajectory 25 of a projectile 23 intersecting a virtual target plane 26 at a point of incidence 28. FIG. 2 illustrates a simplified situation in which trajectory 25 is perpendicular to target plane 26 at incidence point 28. An acoustic sensor 24 is situated at a fixed position on target plane 26.

The mathematical approach of the present invention will first be described in conjunction with the simplified situation of FIG. 2, for explanatory convenience, and then generalized to situations in which the trajectory of projectile 23 is not perpendicular to the target plane.

In FIG. 2, "A" is an arbitrarily selected reference point on trajectory 25 and "B" represents any position of projectile 23 on trajectory 25 between reference point A and target plane 26. As is known in the art, the pressure disturbance caused by projectile 23 at point B is subsequently sensed by sensor 24. For convenience, the time at which projectile 23 passes reference point "A" is defined as a reference time, t=0. For further convenience, a Y-axis is defined in parallel with trajectory 25 at target plane 26. The Y-axis originates at target plane 26, which is defined by an X-axis and a Z-axis, as shown in FIG. 2. Based on the above definitions, the time-delay, $t_s$, of the pressure disturbance sensed by sensor 24 is given by the following equation:

$$t_s = \frac{R_1}{v} + \frac{R_2}{C} = \frac{y - y_0}{v} + \frac{\sqrt{y^2 + d^2}}{C} \tag{2}$$

wherein:

$R_1$ is the distance from points A to point B;

$R_2$ is the distance from point B to sensor 24;

$y_0$ is the Y coordinate of point A relative to plane 26;

$y$ is the Y coordinate of point B relative to plane 26;

$C$ is the speed of sound;

$v$ is the speed of projectile 23; and $d$ is the distance, on the target plane, between incidence point 28 and transducer 24.

It should be noted that the right-hand side of equation (2) consists of two terms. The first term represents the time required by projectile 23 to travel from point A to point B. The second term represents the time required by a pressure disturbance generated at point B to reach sensor 24.

The Y-coordinate of point B for which the earliest pressure disturbance is sensed by sensor 24, which coordinate is denoted $y_f$, is obtained by finding the minimum of $t_s$, i.e. by setting:

$$\left(\frac{dt_s}{dy}\right)_{y=y_f} = 0 \tag{3}$$

which yields the following equation:

$$\frac{1}{v} + \frac{y_f}{C\sqrt{y_f^2 + d^2}} = 0 \tag{4}$$

The solution for $y_f$ in equation (4) is as follows:

$$y_f = -\frac{d}{\sqrt{\frac{V^2}{C^2} - 1}} \tag{5}$$

Substituting $y_f$ for y in equation (2) yields the minimum time-delay, $t_{smin}$, at which the shock wave from projectile 23 is sensed by sensor 24:

$$t_{smin} = -\frac{y_o}{v} + d\sqrt{\frac{1}{C^2} - \frac{1}{v^2}} \tag{6}$$

To collect sufficient information for determining the coordinates of hit point 28, which are defined as (x,0,h), an array of N sensors in a vicinity of target plane 26, at coordinates $x_k, y_k, h_k$, k=1, 2, ..., N, is used. The time delay, $t_k$, of the earliest shock wave to arrive at sensor k, is given by the following equation:

$$t_k = \frac{y_k}{v} - \frac{y_0}{v} + \sqrt{(x_k - x)^2 + (h_k - h)^2} \sqrt{\frac{1}{C^2} - \frac{1}{v^2}}, \quad k = 1, 2, \ldots, N \quad (7)$$

In accordance with the definitions above, the reference for time-delay $t_k$ is at the time projectile 23 arrives at the arbitrary reference point A. However, in reality, the reference time is preferably based on a detectable event, for example on the time the first sonic boom is sensed by any of the sensors. The second term on the right-hand side of equation (7) represents a time-delay common to all the sensors, which time is preferably combined with the common reference time into a single unknown time offset, hereinafter referred to as $t_{\text{offset}}$, common to all the sensors. Thus, in practice, equation (7) is preferably expressed as follows:

$$t_k = t_{\text{offset}} + \frac{y_k}{v} + \sqrt{(x_k - x)^2 + (h_k - h)^2} \sqrt{\frac{1}{C^2} - \frac{1}{v^2}}, \quad (8)$$

$$k = 1, 2, \ldots, N$$

It should be noted that equation (8) includes four unknowns, namely x, h, v and $t_{\text{offset}}$. The use of N sensors provides N independent time-delay measurements which generate a set of N independent equations (8). Thus, a minimum of four sensors are required in order to solve equation (8) for x, h, v and $t_{\text{offset}}$. Alternatively, $t_{\text{offset}}$ can be eliminated by utilizing one sensor as a reference sensor and measuring N-1 time-differences relative to the reference sensor. However, in such a case, measurement errors cannot be considered independent due to the exclusive reliance of all the time-delay measurements on the time-delay measurement of the reference sensor. This complicates the optimal solution of the equations.

It should be noted that at least one of the sensors must not be in-line with the other sensors, preferably at least two of the sensors have different Y coordinates. It can be shown that if all the sensors are in line and parallel with the target plane, velocity v cannot be obtained from the set of equations (8), regardless of the number of sensors used. In one preferred embodiment of the invention, at least three sensors are located substantially on the target plane, i.e. at y=0, and at least one additional sensor is located a short distance in front of the target plane, i.e. at y<0. It should be appreciated that such a configuration enables a reliable estimation of the projectile velocity, v. Although velocity v is unknown, it can be reliably assumed that v is constant over a short portion of trajectory 25 corresponding to the distance between the sensors on the target plane and the at least one sensor in front of the target plane.

It should be noted that equation (8) is a non-linear equation which cannot be solved analytically. Therefore, an iterative least-squares method is preferably utilized to solve the set of equations (8). For example, a variation of a Gauss-Newton estimation algorithm may be used, as described below with reference to the more general embodiment in which the trajectory of the projectile is not perpendicular to the target plane.

Figure 3:
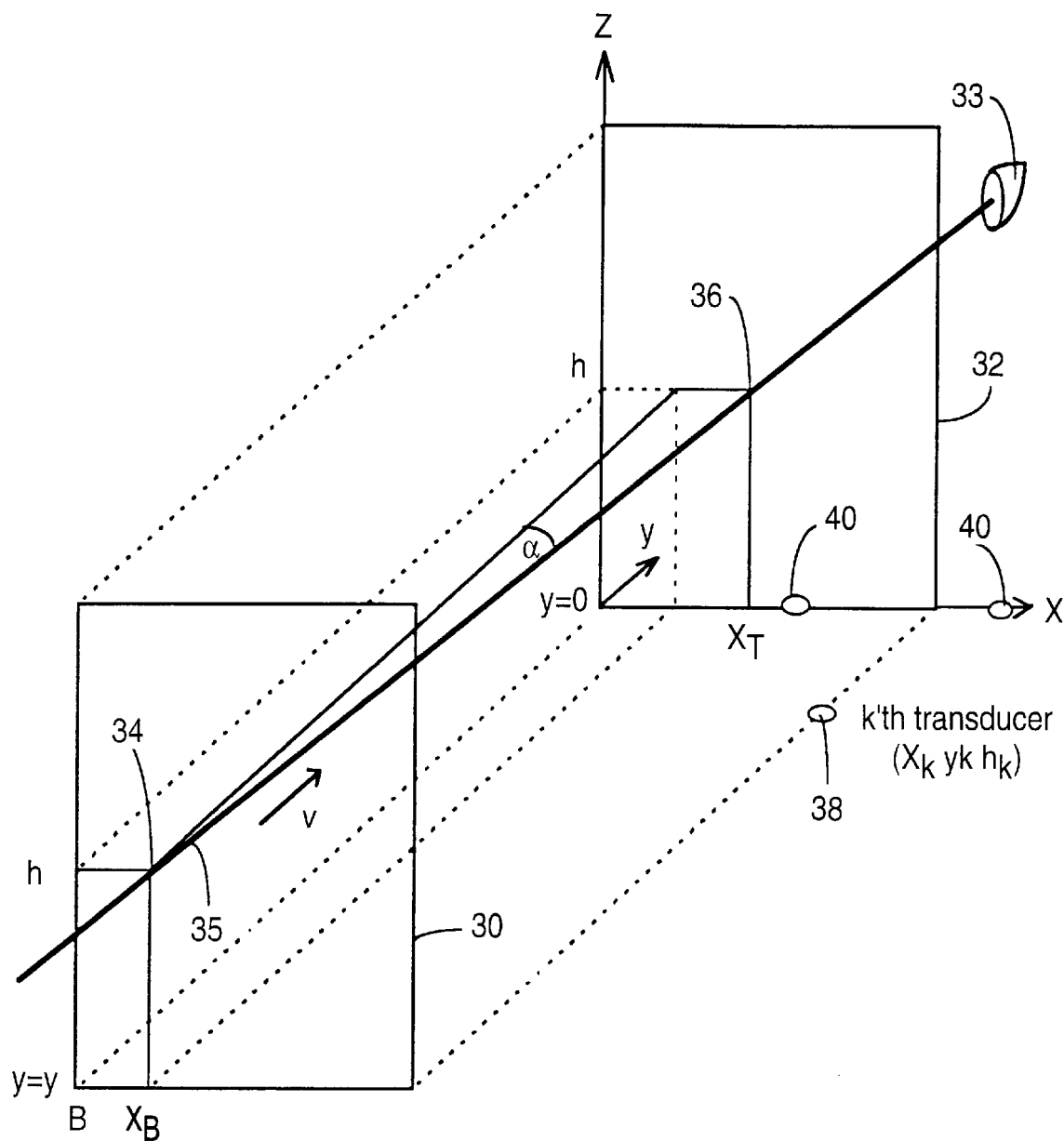
FIG. 3 is a schematic illustration of a projectile trajectory intersecting a virtual target plane, wherein the trajectory is not perpendicular to the target plane.

Reference is now made to FIG. 3 which schematically illustrates a trajectory 35 of a projectile 33, traveling at velocity v and intersecting a virtual target plane 32 at a point of incidence 36. In contrast to the embodiment described above with reference to FIG. 2, trajectory 35 is not normal to target plane 32 at point 36 but, rather, projectile 33 approaches target plane 32 at an angle of incidence, α, relative to the normal.

The descriptions and derivations below are based on the assumption that the angle of incidence, α, has substantially only a horizontal component, as shown in FIG. 3, and substantially no vertical component. In other words, it is assumed that angle α lies on a horizontal incidence plane substantially perpendicular to the generally vertical target plane. It should be appreciated that such an assumption is reasonable for most applications of the present hit indication systems. For example, in a firing range application, as described below with reference to FIG. 4A, the vertical angle of incidence is very shallow, typically on the order of 5 degrees, and therefore, the horizontal model provides a very accurate estimation of the location of the hit. Nevertheless, it should be appreciated that the model described below, which applies to any horizontal incidence angle, can be readily applied, with appropriate modifications, to other, predefined, incidence planes, for example a vertical incidence plane or an oblique incidence plane.

In analogy to the embodiment of FIG. 2, an arbitrary reference plane 30, parallel to target plane 32 is defined at $y=y_B$. Trajectory 35 first intersects plane 30 at a point 34, whose coordinates are $(x_B, y_B, h)$, and then intersects target plane 32 at point 36, whose coordinates are $(x_T, 0, h)$, whereby:

$$x_T = x_B - y_B \tan \alpha \quad (9)$$

An array of N acoustic sensors, preferably including acoustic transducers as are known in the art, are positioned in a vicinity of target plane 32. A plurality of transducers 40, two of which are shown in FIG. 3, are positioned substantially in-line, for example on target plane 32, and at least one additional transducer 38 is positioned a short distance apart from the line of transducers 40, for example a short distance in front of plane 32. As in the embodiment of FIG. 2, the time-delays at transducers 40 and 38 are measured relative to a reference time, t=0, e.g. the time at which projectile 33 crosses reference plane 30. This introduces an unknown offset time, $t_{\text{offset}}$, as described above, to be estimated in addition to the unknown hit coordinates, $x_T$ and h, projectile velocity v and angle α. However, in view of equation (9), an estimation of coordinate $x_B$ can be readily converted to a corresponding estimation of $x_T$. Therefore, in contrast to the four transducers required in the embodiment of FIG. 2, this embodiment of the invention requires independent outputs of at least five sensors to carry out the estimation process, as described below.

In accordance with the present invention, the time-delay at transducer 38, whose coordinates are $(x_k, y_k, h_k)$, is given by the following non-linear equation:

$$t_k = t_{\text{offset}} - \frac{1}{v}[(x_B - x_k)\sin\alpha + (y_B - y_k)\cos\alpha] + \quad (10)$$

$$\sqrt{[(x_B - x_k)\cos\alpha - (y_B - y_k)\sin\alpha]^2 + (h - h_k)^2} \sqrt{\frac{1}{C^2} - \frac{1}{v^2}},$$

$$k = 1, 2, \ldots, N$$

wherein the Y coordinate, $y_B$, of arbitrary reference plane 30 is set arbitrarily, for example at $y_B=0$ meters.

It should be noted that the reference time frame, from which all the time delays $t_k$, are measured, may also be set arbitrarily. However in reality, as explained above, the reference time frame is preferably based on the time of the earliest arrival of a supersonic boom at any of the sensors. It should be noted that in equation (10), time-delay $t_k$ is expressed exclusively as a function of spatial parameters, the velocity of projectile 33 and the speed of sound, and independently of the time-delays measured at the other sensors. Thus, a set of N equations (10) are constructed, each equation isolating the time-delay measured at one of the sensors from the time-delays measured at the other sensors. This isolation of the time-delays enables use of least-squares estimation methods, an example of which is described below. Without such isolation of the time-delays, it would not have been possible to estimate the hit coordinates by using least-squares estimation methods as are known in the art.

It should be appreciated that the successful derivation of non-linear equation (10) is a result of extensive, complex, algebraic manipulations which have been performed by the present inventor.

Figure 4A:
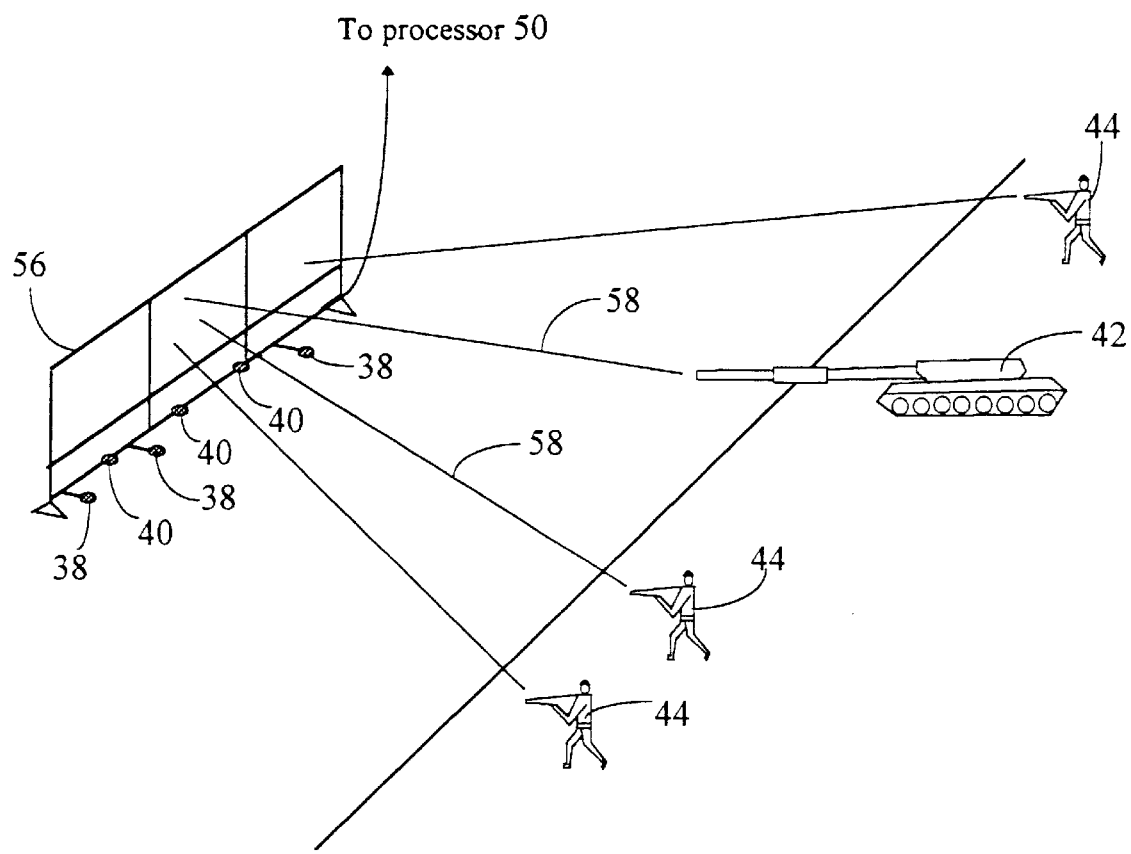
FIG. 4A is a schematic illustration of weapons firing at a target range equipped with a hit indication system in accordance with a preferred embodiment of the present invention.

Reference is now made to FIG. 4A which schematically illustrates weapons firing at a target range equipped with a hit indication system in accordance with a preferred embodiment of the present invention. As shown symbolically in FIG. 4A, the present invention is suitable for indicating hits of rifle bullets fired by marksmen 44, as well as hits of shells fired, for example, from a tank 42. The projectiles fired by marksmen 44 and/or tank 42 have trajectories 58, at least some of which intersect a predefined target area 56. The array of sensors described above, i.e. transducers 40 and 38, are fixedly mounted at preselected positions in the vicinity of target area 56. Transducers 40 are preferably spread underneath target area 56, to avoid being hit by the projectiles, covering the entire width of the target area. Transducers 38 are positioned underneath and a short distance in front of target area 56, as shown in FIG. 4A.

Figure 4B:
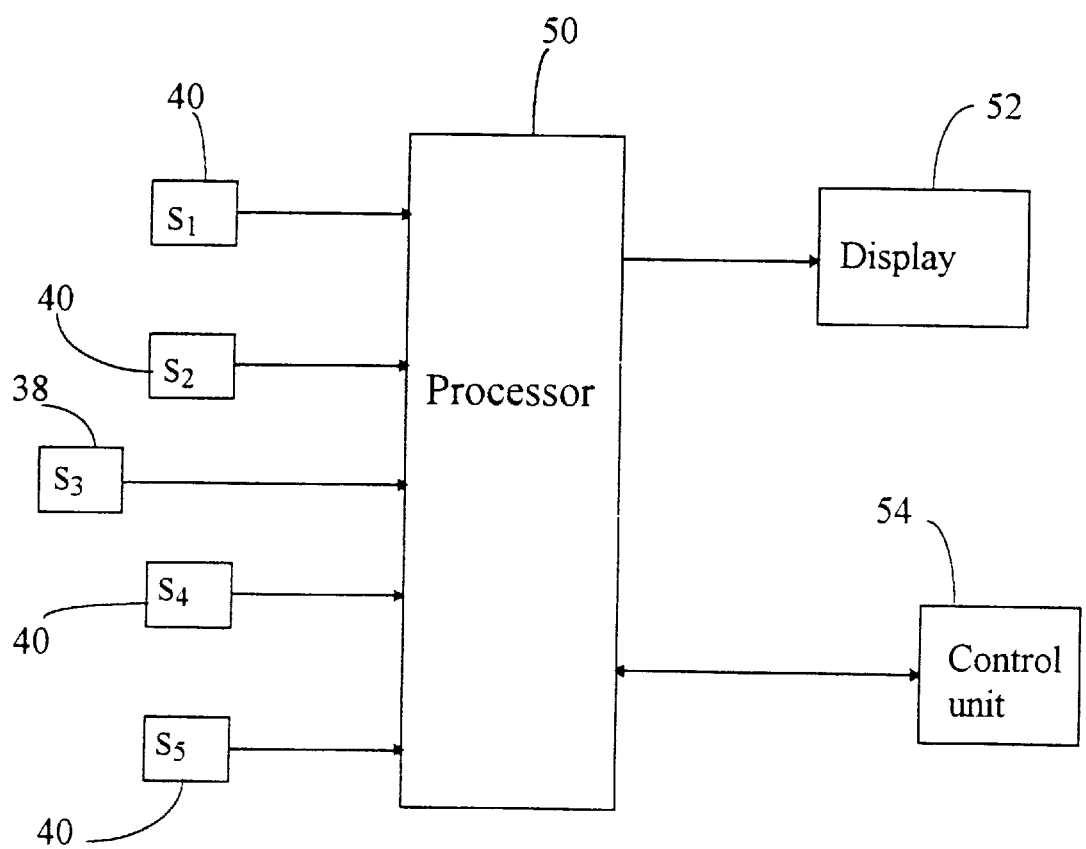
FIG. 4B is schematic, block diagram, illustration of preferred circuitry for the hit indication system of FIG. 4A.

FIG. 4B schematically illustrates a block diagram of preferred circuitry for the hit indication system of FIG. 4A. The outputs of transducers 40 and 38, denoted $S_1$–$S_5$, are received by a processor 50 which includes circuitry and or software for determining the coordinates of the hits of trajectories 58 on target area 56 (FIG. 4A), in accordance with the calculation and estimations methods described above and below. The hit coordinates determined by processor 50 are preferably subsequently displayed on a display 52 using any desired format, e.g. graphically and or digitally, as is known in the art.

Additionally or alternatively, the hit indication coordinates may be communicated to a central control unit 54 which communicates with at least one, additional, hit indication system similar to that shown in FIG. 4A. Control unit 54 may also be utilized to communicate various instructions and/or commands to the different targets.

A preferred method of estimating the unknowns, $t_{offset}$, $x_T$, h, v, α, based on N measurements of $t_k$ (k=1, 2, ..., N), will now be described. Due to the non-linearity of equations (10), the preferred estimation method includes an iterative least square algorithm. The described estimation method is based on a Gauss-Newton estimation method. It should be appreciated that various other estimation methods, as are known in the art, for example modifications of the Gauss-Newton method, e.g. a Levenberg-Marquardt solution, may also be suitable and are also within the scope of the present invention.

A vector of unknowns, $\underline{x}$, a vector of time-delays, $M(\underline{x})$, obtained by applying the set of equations (10) to $\underline{x}$, and a matrix of partial derivatives, $H(\underline{x})$, are defined as follows:

$$\underline{x} = \begin{bmatrix} x_B \\ h \\ v \\ \alpha \\ t_{\text{off}} \end{bmatrix} \quad M(\underline{x}) = \begin{bmatrix} t_1(\underline{x}) \\ t_2(\underline{x}) \\ \vdots \\ t_N(\underline{x}) \end{bmatrix}$$

$$H(\underline{x}) = \begin{bmatrix} \frac{\partial t_1}{\partial x_B} & \frac{\partial t_1}{\partial h} & \frac{\partial t_1}{\partial v} & \frac{\partial t_1}{\partial \alpha} & \frac{\partial t_1}{\partial t_{\text{off}}} \\ \frac{\partial t_2}{\partial x_B} & \frac{\partial t_2}{\partial h} & \frac{\partial t_2}{\partial v} & \frac{\partial t_2}{\partial \alpha} & \frac{\partial t_2}{\partial t_{\text{off}}} \\ \vdots & \vdots & \vdots & \vdots & \vdots \\ \frac{\partial t_N}{\partial x_B} & \frac{\partial t_N}{\partial h} & \frac{\partial t_N}{\partial v} & \frac{\partial t_N}{\partial \alpha} & \frac{\partial t_N}{\partial t_{\text{off}}} \end{bmatrix}$$

wherein first guess values of $\underline{x}$ are used in calculating $M(\underline{x})$ and $H(\underline{x})$, which values are subsequently periodically adjusted before each additional iteration in the estimation process.

The elements in partial derivative matrix $H(\underline{x})$ are obtained as follows. First, for convenience of notation, $Q_k$ is defined as:

$$Q_k = \sqrt{[(x_B - x_k)\cos\alpha - (y_B - y_k)\sin\alpha]^2 + (h - h_k)^2}, \, k = 1, 2, \, , N \quad (11)$$

The partial derivatives are then given by:

$$\frac{\partial t_k}{\partial x_B} = -\frac{\sin\alpha}{v} + \frac{1}{Q_k}\sqrt{\frac{1}{C^2} - \frac{1}{v^2}}\,[(x_B - x_k)\cos\alpha - (y_B - y_k)\sin\alpha]\cos\alpha \quad (12)$$

$$\frac{\partial t_k}{\partial v} = \frac{1}{v^2}[(x_B - x_k)\sin\alpha + (y_B - y_k)\cos\alpha] + \frac{Q_k}{v^3\sqrt{\frac{1}{C^2} - \frac{1}{v^2}}}, \quad (13)$$

$$\frac{\partial t_k}{\partial h} = \frac{h - h_k}{Q_k}\sqrt{\frac{1}{C^2} - \frac{1}{v^2}} \quad (14)$$

$$\frac{\partial t_k}{\partial \alpha} = -[(x_B - x_k)\cos\alpha - (y_B - y_k)\sin\alpha]$$

$$\left\{\frac{1}{v} + \frac{1}{Q_k}\sqrt{\frac{1}{C^2} - \frac{1}{v^2}}\,[(x_B - x_k)\sin\alpha + (y_B - y_k)\cos\alpha]\right\} \quad (15)$$

$$\frac{\partial t_k}{\partial t_{\text{off}}} = 1 \quad (16)$$

As described below, the speed of sound, C, may be measured, pre-estimated, or it can be included as one of the parameters estimated by the iterative estimation method, depending on specific considerations. Including the speed of sound as an unknown in the estimation algorithm requires at least 6 independent sensor outputs, and at least one additional partial derivative as follows:

$$\frac{\partial t_k}{\partial C} = -\frac{Q_k}{C^3\sqrt{\frac{1}{C^2} - \frac{1}{v^2}}} \quad (17)$$

To initiate the estimation algorithm, a first guess of the unknowns in vector $\underline{x}$ is provided. For example, in some preferred embodiments of the invention, the first guesses for the hit coordinates are the coordinates at the center of the target, the first guess for v is an expected projectile velocity, the first guesses for $t_{offset}$ and α are both zero. The values of the unknowns are subsequently updated, using an update equation as is known in the art, as follows:

$$\underline{x}_{i+1} = \underline{x}_i + (H^T H)^{-1} H^T [M_{measured} - M(\underline{x}_i)] \qquad (18)$$

wherein $M_{measured}$ is a vector of actual time-delay measurements, $t_k$ (k=1, . . . N), wherein $H = H(\underline{x}_i)$ and wherein $H^T$ is the transpose of H. The iteration process continues until the effect of the updates becomes negligible, e.g., until the changes in the values of $\underline{x}$ drop below predetermined thresholds, as is known in the art.

It should be noted that random error in the time-delay measurements may cause random error in the estimation of the hit coordinates, $x_T$ and h, as well as in the estimations of velocity v and incidence angle $\alpha$. Assuming that the time-delay measurements are independent and identically distributed (IID) with an unbiased Gaussian distribution having a standard deviation $\sigma_t$, then the random error in the estimation of the hit coordinates is also a Gaussian and the standard deviation of the estimated coordinates is given by:

$$\sigma_{x_T} \approx \sigma_{x_B} = \sigma_t \sqrt{(H^T H)^{-1}_{(1,1)}} \qquad (19)$$

$$\sigma_h = \sigma_t \sqrt{(H^T H)^{-1}_{(2,2)}} \qquad (20)$$

Figure 5A:
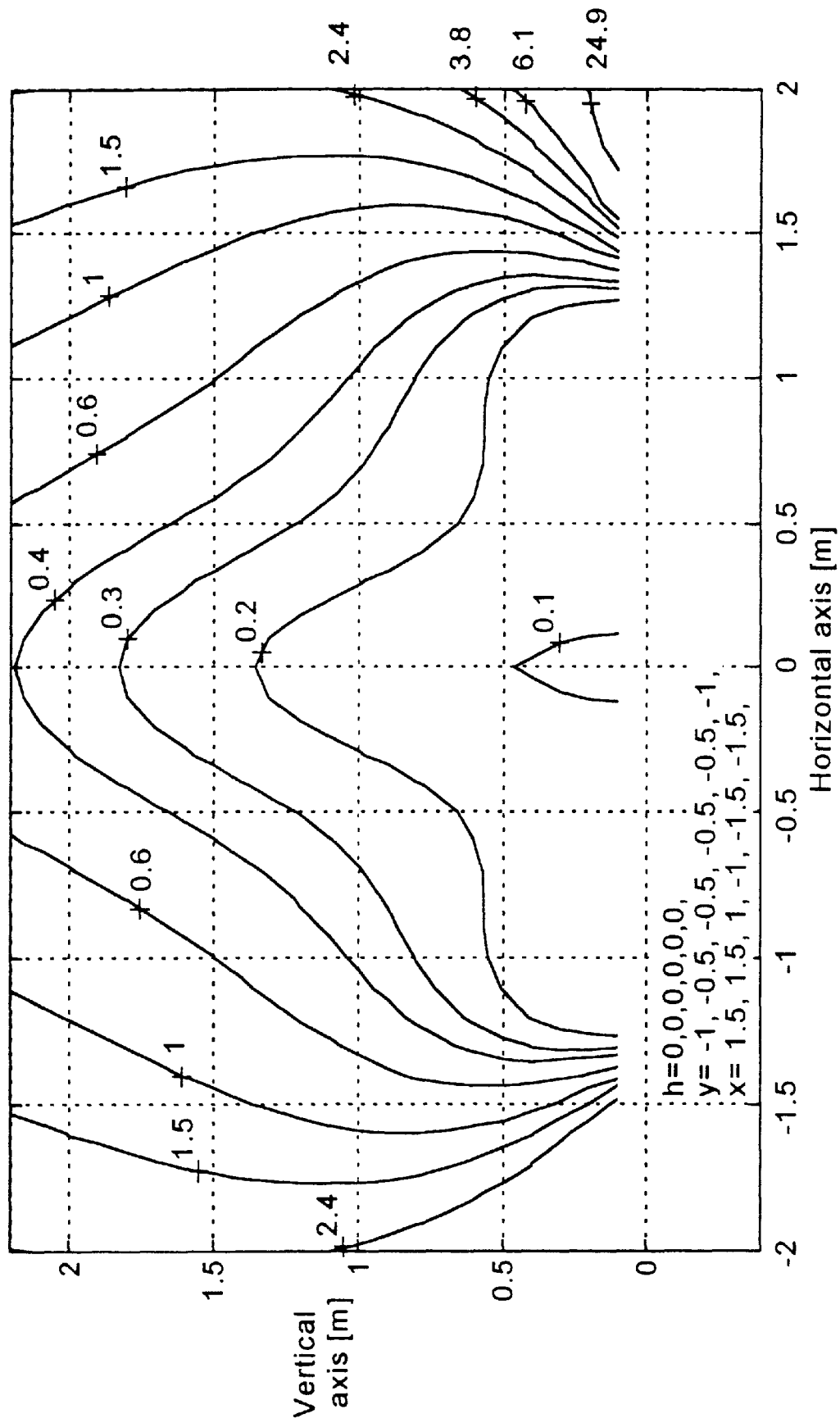
FIGS. 5A and 5B are schematic illustrations of contour plots of the theoretical horizontal random error and the theoretical vertical random error, respectively, of a hit indication configuration in accordance with a preferred embodiment of the present invention.
Figure 5B:
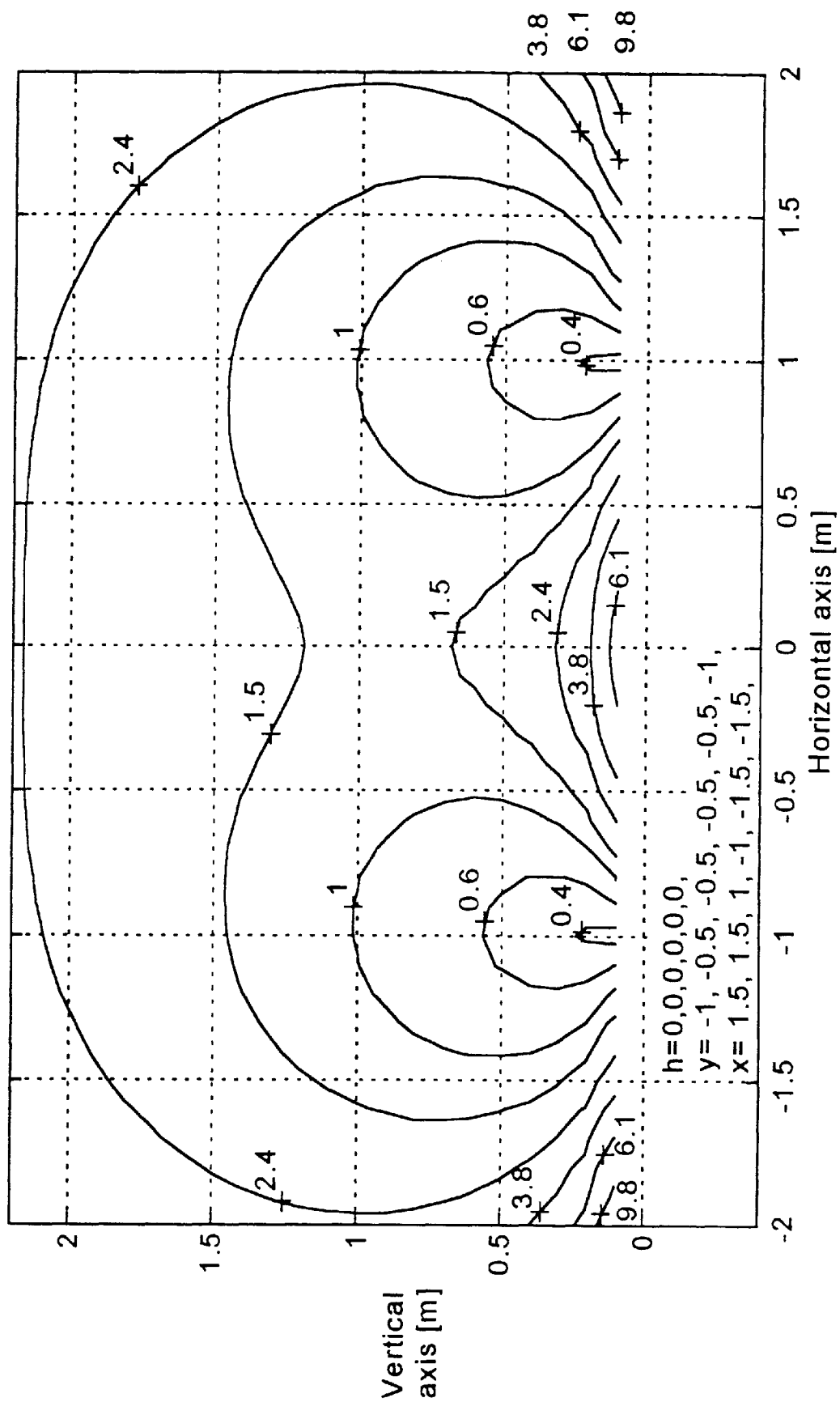
Figure 6:
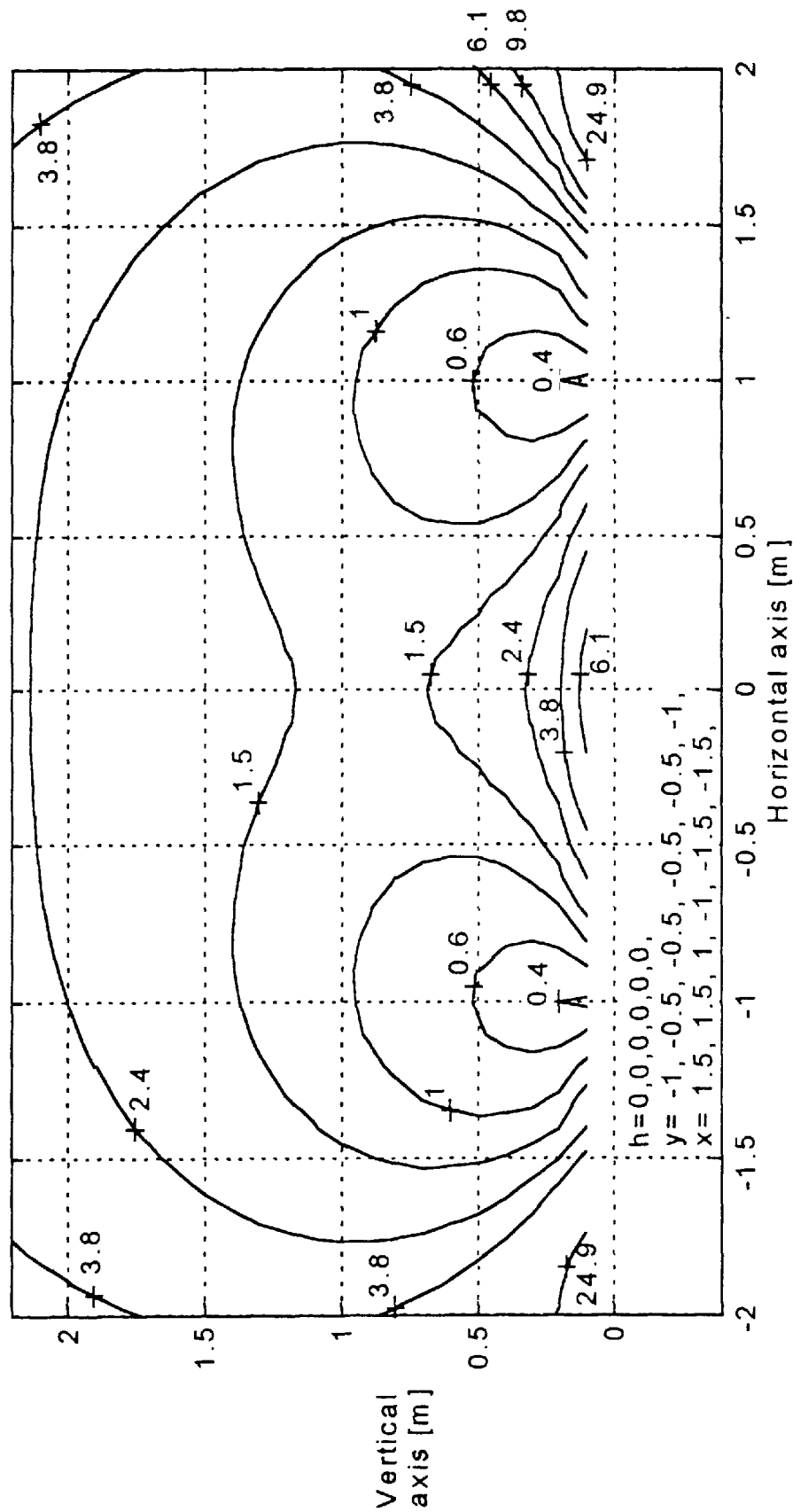
FIG. 6 is a schematic illustration of contour plots of the total theoretical random error of the hit indication configuration of FIGS. 5A and 5B, for a first angle of incidence.

Reference is now made to FIGS. 5A and 5B, which schematically illustrates contour plots of theoretical horizontal and vertical random errors, $\sigma_{x_B}$ and $\sigma_h$, respectively, of one preferred configuration of the hit indication system of the present invention. Reference is also made to FIG. 6 which schematically illustrates contour plots of the total theoretical random error, $\sqrt{\sigma_{x_B}^2 + \sigma_h^2}$, of the preferred hit indication configuration of FIGS. 5A and 5B. The contour plots are based on a random error standard deviation of $\sigma_t = 5$ microseconds in the time-delay measurements. However, since the random error standard deviation of the estimated coordinates is linearly dependent on $\sigma_t$, as shown by equations (18) and (19), the shape of the contour plots of FIGS. 5A–6 are independent of the value of $\sigma_t$. The contour plots in FIGS. 5A–6 are based on an arrangement of sensors at coordinates, in meters, as specified on the plot and on an angle of incidence $\alpha = 0°$. In comparing FIGS. 5A and 5B, it should be noted that the random error in estimating the vertical coordinate, h, is generally larger than the random error in estimating the horizontal coordinate, $x_B$. This results from the fact that, in the arrangement of FIGS. 5A–6, the array of sensors is spread over the horizontal axis, while there is no vertical separation between the sensors. This situation is typical in hit indication systems, to avoid potential hitting of the sensors. It should be appreciated that equations (19) and (20) provide a useful tool in predicting errors for given configurations of sensors.

Figure 7:
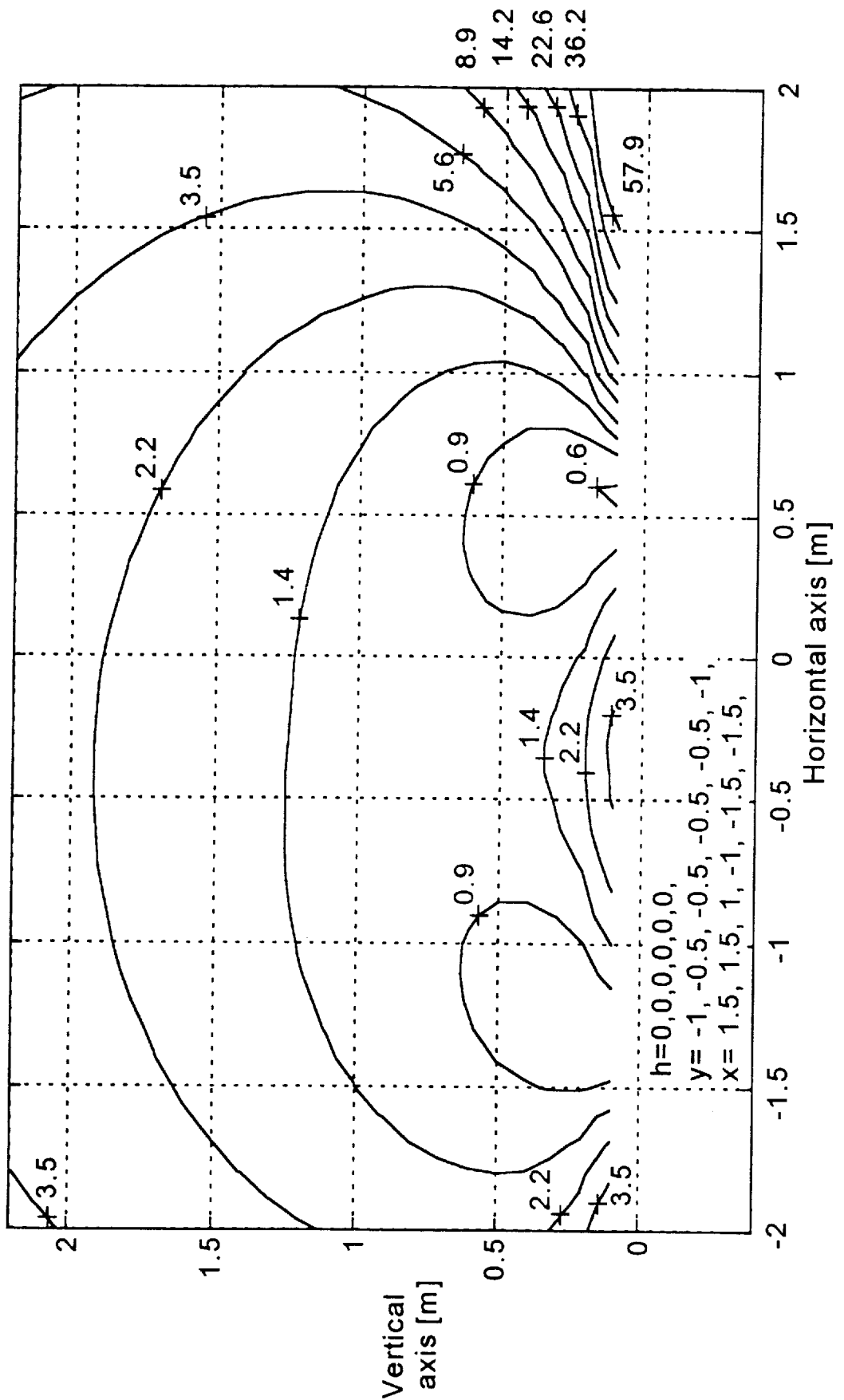
FIG. 7 is a schematic illustration of contour plots of the total theoretical random error of the hit indication configuration of FIGS. 5A and 5B, for a second angle of incidence.

Reference is now made to FIG. 7 which schematically illustrates contour plots of the total theoretical random error of the hit indication configuration of FIGS. 5A and 5B, for a non-zero angle of incidence, namely, for $\alpha = 40°$. Comparing FIGS. 6 and 7, it should be appreciated that, apart from expected changes in the structure of the contours, the increased angle of incidence does not cause a significant increase in the expected error. It should be noted, however, that there is a rapid degradation of accuracy outside the horizontal boundaries of the sensor array.

It should be noted that although the time-delay measurements and the estimation algorithm described above are very accurate and reliable, a number of factors should be considered in order to improve the hit detection accuracy, as described below.

In equation (10), the speed of sound, C, is assumed to be known and, thus, the estimation algorithm is based on a given value of C. In some preferred embodiments of the present invention, C is approximated based on empirical measurements of the temperature, T, in a vicinity of the target plane. For example, the following approximate relationship between T (measured in °K.) and C (in meters per second) may be used:

$$C_{[m/s]} = 20.05 \sqrt{T_{[°K.]}} \qquad (21)$$

In other preferred embodiments of the present invention, a transmitter is provided at a fixed position relative to the transducers. The transmitter transmits a signal which is received by at least some of the transducers and the actual sound velocity, C, is obtained directly based on the time-delays at the transducers and the known distances between the transducers and the transmitter. To avoid using a dedicated transmitter, one of the transducers can be temporarily used as a transmitter by providing an appropriate electric input thereto.

In additional preferred embodiments of the present invention, the number of transducers is increased by at least one, preferably by at least two, i.e. a minimum of 6 or 7 transducers is used, and sound velocity, C, is considered to be an additional unknown in the set of equations (10). Thus, C is estimated together with the other five unknowns using an estimation algorithm as described above. It has been found by the present inventor that in the embodiments where velocity C is determined as a sixth unknown, the estimation accuracy can be improved by positioning at least one transducer at a vertical coordinate substantially different from that of at least one, other, transducer.

Figure 8:
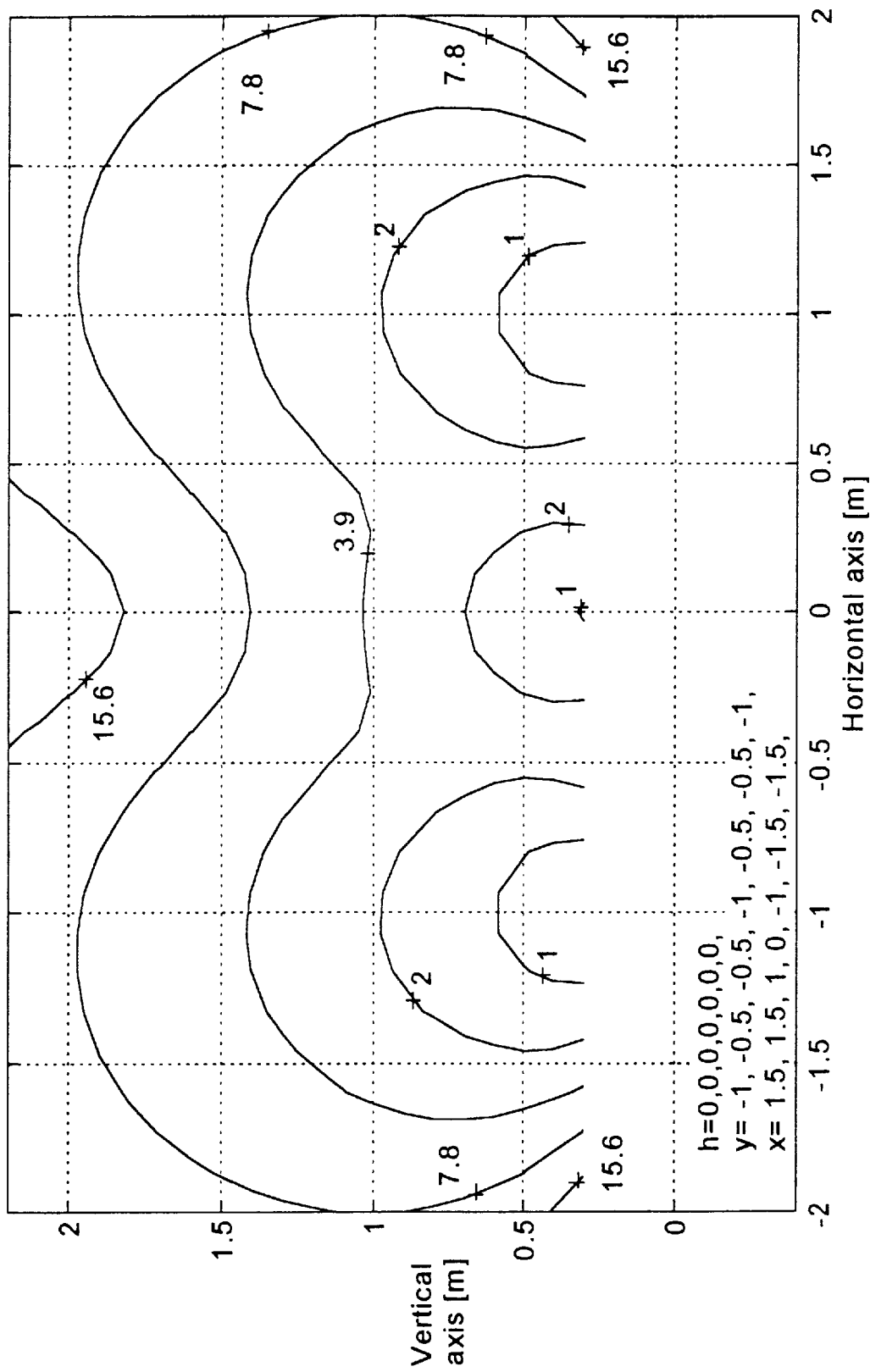
FIG. 8 is a schematic illustration of contour plots of the total theoretical random error of a first preferred variation of the hit indication configuration of FIGS. 5A and 5B.
Figure 9:
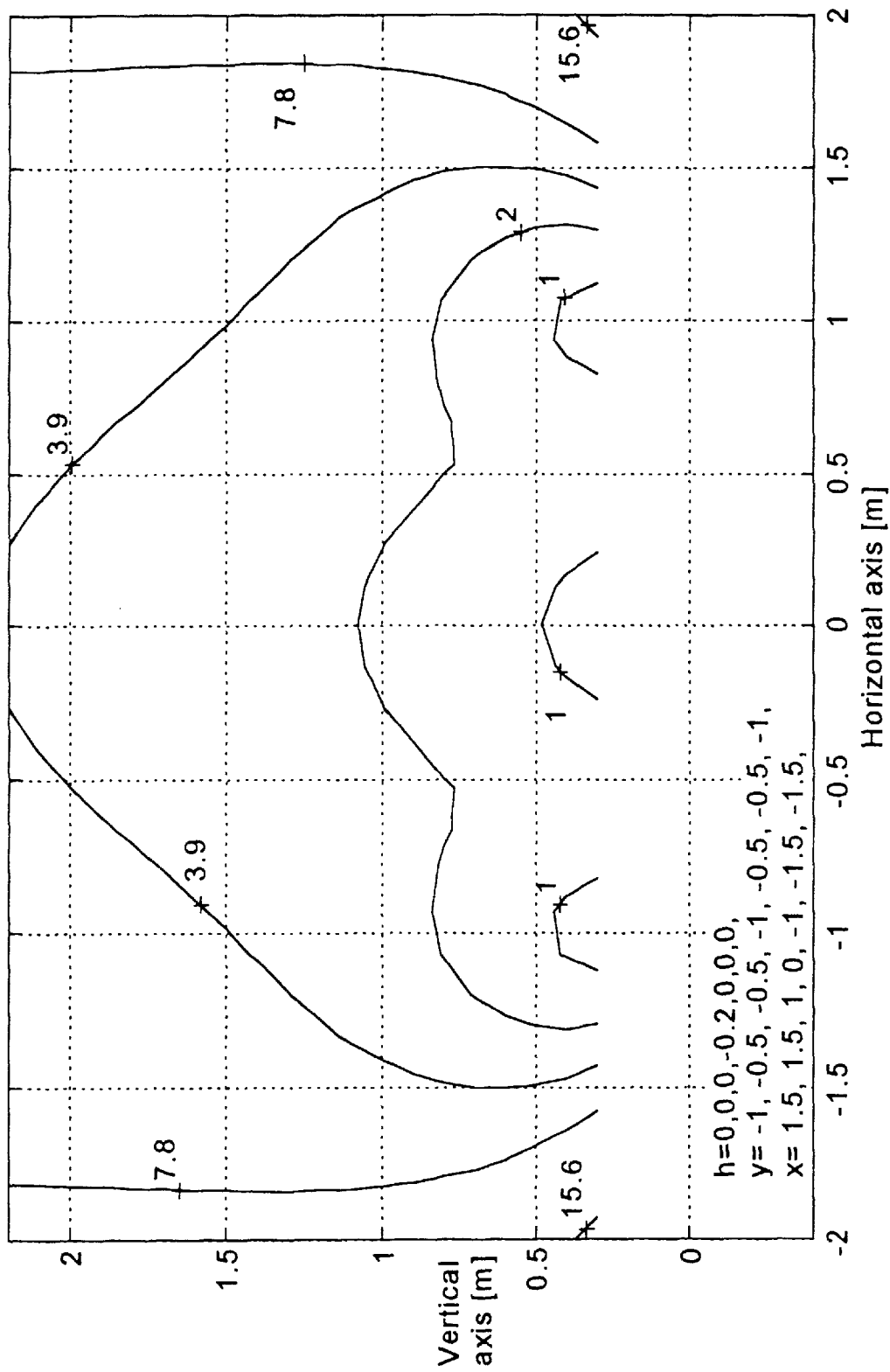
FIG. 9 is a schematic illustration of contour plots of the total theoretical random error of a second preferred variation of the hit indication configuration of FIG. 5A and 5B.
Figure 10:
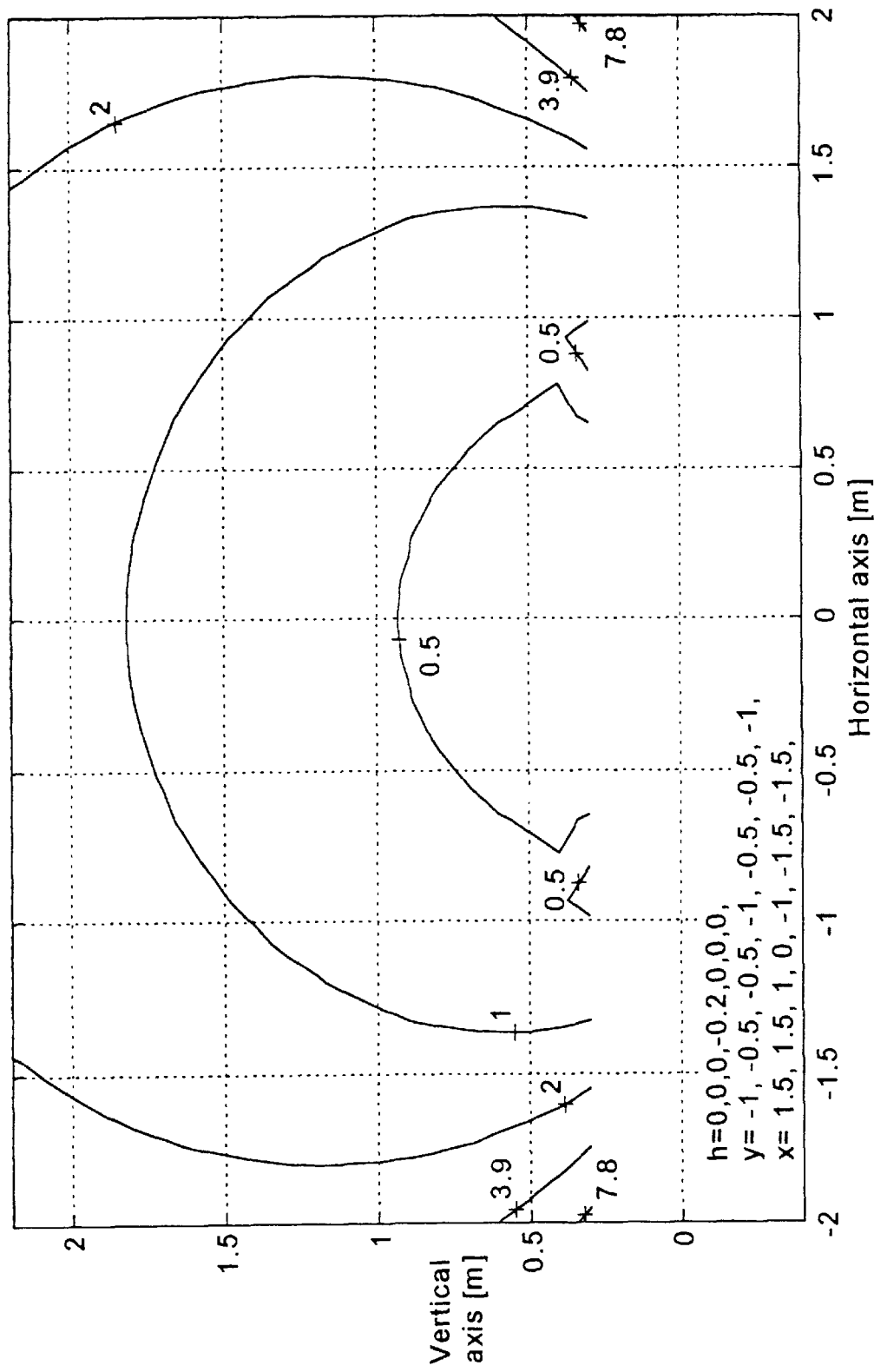
FIG. 10 is a schematic illustration of contour plots of the total theoretical random error of a third preferred variation of the hit indication configuration of FIG. 5A and 5B.

Reference is now made to FIGS. 8–10 which schematically illustrates contour plots of the total theoretical random error in a first, a second and a third preferred variation, respectively, of the hit indication configuration of FIGS. 5A and 5B. In FIG. 8, C is estimated based on a configuration in which all the transducers have the same vertical coordinate. In FIG. 9, C is estimated based on a configuration in which one of the transducers is lower than the other transducers by 20 centimeters. In FIG. 10, C is assumed to be known and the transducer configuration is the same as that of FIG. 9.

Comparing FIGS. 8 and 9, it should be noted that, by positioning one transducer slightly off the horizontal plane of the other transducers, the hit indication accuracy in the upper central portion of the target is improved by a factor of about 4.

Comparing FIGS. 9 and 10, which both use the same transducer configuration, it is noted that when C is added as a sixth unknown, the total error in the estimation of the hit coordinates is increased, mostly due to an increased error in the vertical coordinate, h. It should be appreciated that an incorrectly assumed value of C, in the embodiment of FIG. 10, introduces a bias error which is generally more apparent in the vertical coordinate than in the horizontal coordinate.

It is appreciated that substantial winds in the vicinity of the target may cause a non-uniform bias error in the speed of sound. Specifically, the speed of sound is increased, when the sound travels "with" the wind, and decreased when the sound travels "against" the wind. In this respect, cross winds, i.e. winds having a large component along the X-axis at the target plane, generally represent the worst case, wherein the speed of sound towards the transducers on the right of the hit may be substantially different from the speed of sound towards the transducers on the left of the hit. It has been found, however, that in most hit detection applications, taking wind effects into account does not significantly improve the accuracy and, therefore, does not warrant the complexity involved in measuring wind speeds and incorporating them in the time-delay equations.

Another factor which may be considered is the criterion used in determining the times of arrival of sonic booms at the transducers. A simple threshold may not be suitable because the magnitudes of the transducer outputs may vary considerably, as depicted in FIG. 2 above. Furthermore, the transducer outputs may be affected by noise, e.g. thermal or atmospheric noise. Thus, in some preferred embodiments of the present invention, the transducer outputs are filtered, using a filter adapted to the response of specific transducers used, and the times of arrival are determined by peak detector circuitry or software, as is known in the art.

As described above, the iterative least-squares algorithm requires a first guess of the unknowns, particularly of the hit coordinates. A recommended first guess for the height coordinate, h, is at the middle of the target. It has been found, that an efficient first guess for the horizontal coordinate, $x_B$, is at the transducer which receives the first sonic boom. As described above, a preferred first guess for the incidence angle, $\alpha$, is zero, and a preferred first guess for the projectile velocity, v, is an expected projectile velocity.

It should be appreciated that, if the number of transducers used is greater than the number of unknowns, e.g. 5, the set of equations (10) may be solvable even if some of the transducers become defective or introduce intolerably large errors. Thus, the preferred estimation algorithm is preferably adapted for removing outliers. A number of methods are known in the art for removing outliers in least-squares algorithm. These methods are generally based on determining residuals, i.e. differences between actual measurements and calculated measurements, after a predetermined number of iterations. The absolute value of an outlier residual is generally substantially larger than that of the other residuals and, thus, outliers can be identified by residual comparison. Once identified, outlier time-delays can be ignored as long as the total number of time-delays is sufficient for solving equations (10). Defective transducers can be traced, for example, by tracing transducers which are repeatedly identified as outliers.

An iterative, least-squares, software implementation using MATLAB, of an estimation algorithm in accordance with a preferred embodiment of the present invention, will now be disclosed. It should be understood that the following software implementation is disclosed as part of the best mode of carrying out the present invention, and that various other estimation methods and algorithms and software implementations thereof are also within the scope of the present invention. The disclosed MATLAB algorithm is as follows:

The main program

```
% saved as "hit_ind.m"
% requires subroutine "hit_indf.m" on the same directory
% Least-squares solution, allowing horizontal angle
clear
% ******* measurements data ***************************
% An example of measured data in units of 0.5 microseconds
tq=[0 1321 363 256 1053 892 2742 9283 12473 13028 15749 19146 22569 23435];
tm=0.5e-6*tq; % in seconds
dtm=tm'; % transpose
temp=input('Ambient temperature in Degrees Celsius = ?');
c=20.05*sqrt(temp+273); % speed of sound in [m/s]
% c=348; % speed of sound in m/s at 25 deg C.
% ********* the tranducer locations***************
x0= [ 3.49 3.49 2.813 2.145 1.475 1.475 .81];
y0=-0.1'[-.5   0    0    0    0  -.495 0];
x00= [ -.83 -1.503 -1.503 -2.17 -2.84 -3.50 -3.50 ];
y00=-0.1+[   0    0  -.495   0    0    0  -.495 ];
x=[x0 x00];
y=[y0 y00];
kk=length(x);
% ******************************************
factor=1.5; % used in setting the residuals threshold for outliers removal
yb=0; % [m] (Arbitrarily selected)
% ******* Initial uniform weight matrix *********
wv=ones(size(x));
bad=find(tm<0); % a negative reading indicates defective measurement
if bad ~= [ ]
    wv(bad)=1e-6*ones(size(bad));
end % reducing the weight of sensors with known defective measurement
w=diag(wv,0);
% ****** First Guess *******************
t2ndline=tm([2 3 4 5 7 8 9 11 12 13]); % the sensors in the raw closer to the target
tmok=find(t2ndline>=0); % Do not consider problematic transducers which read negative value
tmokk=t2ndline(tmok);
nearsens=find(tm==min(tmokk)); % find the good tranducer (in the 2nd raw) that received 1st
xbm=x(nearsens); % use the horizontal coordinate of the 1st transducer as first guess of x
hm=1;
vm=1000; toffsetm=0; alfam=0;
for round=1:3; % perform 3 rounds of iterations
% ******* The iterative weighted least-squares algorithm *******
hit_indf % performs a round of iterations
```

-continued

```
% ****Iterations terminated. Checking the residuals *********
resid1=(dtm-dtc).*wv';
aresid1=abs(resid1);
resid1std=std(resid1);
factora=factor;
threshold=factora*resid1std;
outlier1=find(aresid1>threshold);
% **** Raise threshold above 1.5 if there is more than one outlier ****
while length(outlier1)>1
     factora=factora*1.1;
     threshold=factora*resid1std;
     outlier1=find(aresid1>threshold);
end
% ************ Update the weight matrix *****************
wv(outlier1)=.0001*ones(size(outlier1)); % lowering the weight of the outlier
w=diag(wv,0); % make a diagonal matrix from the weight vector
end % of 3 rounds of iterations
% **** 3 rounds of Iterations terminated. Display result **************
xtm=xbm-yb*sm/cm; % The x hit coordinate in the target plane
alfadegm=alfam*180/pi;
final(1)=xtm; final(2)=hm; final(3)=alfadegm; final(4)=vm/1000; final(5)=resid1std*1e6;
disp(' ')
disp('x[m]   h[m]    alfa[deg]   velocity[km/s]  std[microsec]')
disp(' ')
disp(final)
The subroutine % saved as "hit_indf.m"
% a subroutine for "hit_ind.m"
stepsq=100;
q=0;
% ******** Iterations ********************
while (stepsq>.001)&(q<11)
q=q+1; % the iteration number
cm=cos(alfam); sm=sin(alfam);
% ***** The calculated delays **********
cv=sqrt(1/c^2-1/vm^2);
for k=1:kk;
     ctrec1=-1/vm*((yb-y(k))*cm+(xbm-x(k))*sm);
     ctrec(k)=ctrec1+sqrt((((xbm-x(k))*cm-(yb-y(k))*sm)^2+hm^2)*(1/c^2-1/vm^2));
     ctrec(k)=ctrec(k)+toffsetm;
end
% ******** The partial derivatives ******
for k-1:kk;
     xxm=(xbm-x(kk))*cm-(yb-y(k))*sm;
     rt=sqrt(xxm^2+hm^2);
     tx(k)=cv*xxm/rt*cm-sm/vm;
     th(k)=cv*hm/rt;
     tv(k)=((xbm-x(k))*sm+(yb-y(k))*cm)/vm^2+rt/(vm^3*cv);
     rtk(k)=rt;
     toff(k)=1;
     talfa(k)=-xxm*(1/vm+cv/rt*((xbm-x(k))*sm+(yb-y(k))*cm));
     % tcsound(k)=-rt/(c^3*cv); % used if the speed of sound is estimated from the delay
measurements
end
for k=1:kk
  hh(k,1)=tx(k);
  hh(k,2)=th(k);
  hh(k,3)=tv(k);
  hh(k,4)=toff(k);
  hh(k,5)=talfa(k);
  % hh(k,6)=tcsound(k);
end
% ****** The calculated vector *********
for k=1:kk
     dtc(k,1)=ctrec(k);
end
% *****************************************
g=hh'*w*hh;
ig=inv(g);
step=ig*hh'*w*(dtm-dtc);
stepsq=sqrt(sum(step.*step));
xbm=xbm+step(1);
hm=hm+step(2);
hm=abs(hm);
vm=vm+step(3);
if(vm>1600)|(vm<400)
     vm=1000; % does not accept unreasonable projectile velocity
end
toffsetm=toffsetm+step(4);
```

-continued

```
        alfam=alfam+step(5);
            % **** If C is estimated *******
            % c=c+step(6);
            % if (c>360)|(c<320)
            %    c=348; % does not accept unreasonable velocity of sound
            % end
        end
        % ****Iterations terminated **************
```

It will be appreciated by persons skilled in the art that the present invention is not limited by the preferred embodiments thus far described by way of example and with reference to the accompanying drawings. Rather, the scope of the present invention is limited only by the following claims:

I claim:

1. A method of indicating information related to the trajectory of a projectile traveling at a supersonic velocity, the trajectory intersecting a predefined target plane at a point of incidence and having an angle of incidence with said target plane, the method comprising:

sensing a shock wave generated by the projectile at a plurality of fixed locations in a vicinity of said target plane, not all of which locations lie on a single straight line, and providing a plurality of outputs responsive, respectively, to the shock wave sensed at said plurality of locations;

determining a time-delay for each of said plurality of locations, relative to a predefined, common, reference time, based on said plurality of outputs; and determining at least one of said point of incidence, said angle of incidence, said supersonic velocity and a time offset which represents said reference time, by at least estimating a solution to a set of time-delay equations of the form $$t_k = t_{\text{offset}} - \frac{1}{v}[(x_T - x_k)\sin\alpha - y_k\cos\alpha] + \sqrt{[(x_T - x_k)\cos\alpha + y_k\sin\alpha]^2 + (h - h_k)^2} \sqrt{\frac{1}{C^2} - \frac{1}{v^2}}, k = 1, 2, \ldots, N$$

wherein $(x_k, y_k, h_k)$, k=1, 2, ..., N, represent the coordinates of N of said locations, respectively, $t_k$ represent the determined time-delays, C represents the velocity of sound, v represents said projectile supersonic velocity, $\alpha$ represents said angle of incidence, $t_{\text{offset}}$ represents the time offset, and $x_T$ and h represent coordinates of said trajectory on said target plane.

2. A method according to claim 1, wherein said plurality of locations comprise at least five separate locations in the vicinity of the target plane.

3. A method according to claim 1 and further comprising providing an output responsive to the estimated value of at least one of said point of incidence, said angle of incidence and said supersonic velocity.

4. A method according to claim 1 and comprising displaying the estimated value of at least one of said point of incidence, said angle of incidence and said supersonic velocity.

5. A method according to claim 1 wherein at least two of said locations are not at the same distance from said target plane.

6. A method according to claim 5, wherein said plurality of locations comprises a first group of locations positioned substantially along a line parallel to said target plane, and a second group of at least one additional location positioned at a different distance from said target plane than said first group of locations.

7. A method according to claim 1 wherein at least estimating a solution to said set of time-delay equations comprises applying a least-squares estimation algorithm.

8. A method according to claim 7 wherein applying a least-squares estimation algorithm comprises applying an iterative least-squares estimation algorithm.

9. A method according to claim 7 wherein applying a least-squares estimation algorithm comprises applying a variation of a Gauss-Newton solution.

10. A method according to claim 1 wherein said incidence angle lies on a predefined incidence plane substantially perpendicular to said target plane.

11. A method according to claim 10 wherein said incidence plane comprises a substantially horizontal plane.

12. A method according to claim 1 wherein said target plane comprises a substantially vertical plane.

13. A system for indicating information related to the trajectory of a projectile traveling at a supersonic velocity and intersecting a predefined target plane at a point of incidence, said trajectory having an angle of incidence with said target plane, the system comprising:

a plurality of acoustic sensors located at fixed positions in a vicinity of said target plane, not all of which positions lie on a single straight line, each sensor providing an output responsive to a shock wave generated by said projectile; and a processor which determines a time-delay for each of said plurality of positions, relative to a predefined, common, reference time, based on the output of said sensors, and which determines at least one of said point of incidence, said angle of incidence, said supersonic velocity and a time offset which represents said reference time, by at least estimating a solution to a set of time-delay equations of the form $$t_k = t_{\text{offset}} - \frac{1}{v}[(x_T - x_k)\sin\alpha - y_k\cos\alpha] + \sqrt{[(x_T - x_k)\cos\alpha + y_k\sin\alpha]^2 + (h - h_k)^2} \sqrt{\frac{1}{C^2} - \frac{1}{v^2}}, k = 1, 2, \ldots, N$$

wherein $(x_k, y_k, h_k)$, k=1, 2, ..., N, represent the coordinates of N of said locations, respectively, $t_k$ represent the determined time-delays, C represents the velocity of sound, v represents said projectile supersonic velocity, $\alpha$ represents said angle of incidence, $t_{\text{offset}}$ represents the time offset, and $x_T$ and h represent coordinates of said trajectory on said target plane.

14. A system according to claim 13, wherein said plurality of sensors comprises at least five sensors.

15. A system according to claim 13 and further comprising a display which displays the estimated value of at least one of said point of incidence, said angle of incidence and said supersonic velocity.

16. A system according to claim 13 wherein at least two of said sensors are not at the same distance from said target plane.

17. A system according to claim 16, wherein said plurality of sensors comprises a first group of sensors positioned substantially along a line parallel to said target plane, and a second group of at least one additional sensor positioned at a different distance from said target plane than said first group of sensors.

18. A system according to claim 13 wherein said processor at least estimates a solution to said set of time-delay equations by applying a least-squares estimation algorithm.

19. A system according to claim 18 wherein said least-squares estimation algorithm comprises an iterative least-squares estimation algorithm.

20. A system according to claim 18 wherein said least-squares estimation algorithm comprises a variation of a Gauss-Newton solution.

21. A system according to claim 13 wherein said target plane comprises a substantially vertical plane.

22. A system according to claim 13 wherein said angle of incidence lies on a predefined incidence plane substantially perpendicular to said target plane.

23. A system according to claim 22 wherein said incidence plane comprises a substantially horizontal plane.

24. A system according to claim 13 and comprising a control unit, wherein said processor provides said control unit with an output responsive to said estimated value of at least one of said point of incidence, said angle of incidence and said supersonic velocity.

25. A system according to claim 13 wherein said plurality of acoustic sensors comprises a plurality of acoustic transducers.

26. A system according to claim 13, wherein said processor is configured to ignore outlier time-delays.

27. A system according to claim 13, wherein the set of time-delay equations is an explicit scalar expression of the time-delays as a function of said point of incidence, said angle of incidence and said supersonic velocity, and an iterative algorithm, involving analytical expressions of the derivatives of said time-delays with respect to said point of incidence, said angle of incidence and said supersonic velocity, is utilized to solve the set of time-delay equations.

* * * * *